United States Patent
Fiszer et al.

(10) Patent No.: US 12,293,672 B2
(45) Date of Patent: May 6, 2025

(54) METHOD AND SYSTEM FOR DRONE OBSERVATION MANAGEMENT

(71) Applicant: MOTOROLA SOLUTIONS, INC., Chicago, IL (US)

(72) Inventors: Piotr Fiszer, Czestochowa (PL); Pawel Niemiec, Rzeszow (PL); Ariel Levy, Petah Tiqwa (IL); Tejeash Duraimanickam, Lunas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 294 days.

(21) Appl. No.: 18/059,056

(22) Filed: Nov. 28, 2022

(65) Prior Publication Data

US 2024/0177617 A1    May 30, 2024

(51) Int. Cl.
*G08G 5/32* (2025.01)
*G06V 20/17* (2022.01)

(52) U.S. Cl.
CPC .............. *G08G 5/32* (2025.01); *G06V 20/17* (2022.01)

(58) Field of Classification Search
None
See application file for complete search history.

(56) References Cited

U.S. PATENT DOCUMENTS

| | | | | |
|---|---|---|---|---|
| 8,639,396 | B1 * | 1/2014 | Hirsch | G05D 1/104 340/995.13 |
| 9,494,937 | B2 | 11/2016 | Siegel et al. | |
| 9,744,665 | B1 * | 8/2017 | Linnell | B25J 9/1682 |
| 10,240,936 | B1 | 3/2019 | Saad et al. | |
| 10,389,432 | B2 | 8/2019 | De Rosa et al. | |
| 11,189,180 | B2 | 11/2021 | Gurel et al. | |
| 11,242,143 | B2 * | 2/2022 | Michini | G05D 1/0033 |
| 11,536,855 | B2 * | 12/2022 | Bennington | G01S 19/14 |
| 2017/0032587 | A1 * | 2/2017 | Cheatham, III | G07C 5/008 |
| 2017/0069214 | A1 * | 3/2017 | Dupray | G08G 5/0008 |
| 2018/0275654 | A1 * | 9/2018 | Merz | G08G 5/0082 |
| 2024/0044651 | A1 * | 2/2024 | Stasiowski | G05D 1/2465 |

OTHER PUBLICATIONS

R. A. Nazib and S. Moh, "Routing Protocols for Unmanned Aerial Vehicle-Aided Vehicular Ad Hoc Networks: A Survey," in IEEE Access, vol. 8, pp. 77535-77560, 2020, (Year: 2020).*
J. Adriaens, S. Megerian and M. Potkonjak, "Optimal Worst-Case Coverage of Directional Field-of-View Sensor Networks," 2006 3rd Annual IEEE Communications Society on Sensor and Ad Hoc Communications and Networks, 2006, pp. 336-345, doi: 10.1109/SAHCN.2006.288438.

(Continued)

*Primary Examiner* — Jelani A Smith
*Assistant Examiner* — Jacob Daniel Underbakke

(57) ABSTRACT

A computer-implemented method and system for observation management of a drone is disclosed. The computer-implemented method includes generating suitability scores for at least first and second of potential drone flight paths that correspond to first and second out-of-Line Of Sight (LOS) time intervals. The computer-implemented method also includes generating a recommendation message that recommends one of the first and second potential drone flight paths as more suitable than one or more others of a plurality of potential flight paths for the drone.

20 Claims, 11 Drawing Sheets

(56) References Cited

OTHER PUBLICATIONS

Kseniacoffman: "When City Surveillance Cameras Aren't There to Monitor Crowds: 1993 vs 2011", https://kseniacoffman.wordpress.com/category/public-safety-wireless/, Jun. 17, 2011, all pages.
Alexis, Kostas. "Technical Report: Optimal Surveillance of Dynamic Parades using Teams of Aerial Robots." arXiv preprint arXiv:1701.00019 (2016).
Wojciech Kucharski, Pawel Jurzak, Grzegorz Kaplita: "The Method for Optimizing a Route for Convoys to Add/Extend Camera Coverage", Motorola Solutions, Inc. 2018, all pages.

* cited by examiner

METHOD AND SYSTEM FOR DRONE OBSERVATION MANAGEMENT

BACKGROUND

As drones become more and more prevalently used, the need for drone operation to be carefully regulated is increasing with the aim of reducing the number of accidents such as, for example, accidents where drones collide with planes, accidents where drones crash into people, etc. The risk of a drone accident may increase when the drone is operated Beyond Visual Line of Sight (BVLOS). In other words, if there is, for example, a building/obstruction blocking an operator of a drone from actually seeing the drone, then that drone is BVLOS.

When the operator of a drone can actually see that his drone is approaching too close to something, the operator can use that visually acquired information to alter a course of that drone to avoid a potential collision. However, in the case of BVLOS, the operator cannot see the drone (i.e. via naked eye, or via binoculars, or via other similar optical lens-based accessories). Thus, potential collision has to be detected (and ultimately avoided) in some other manner.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
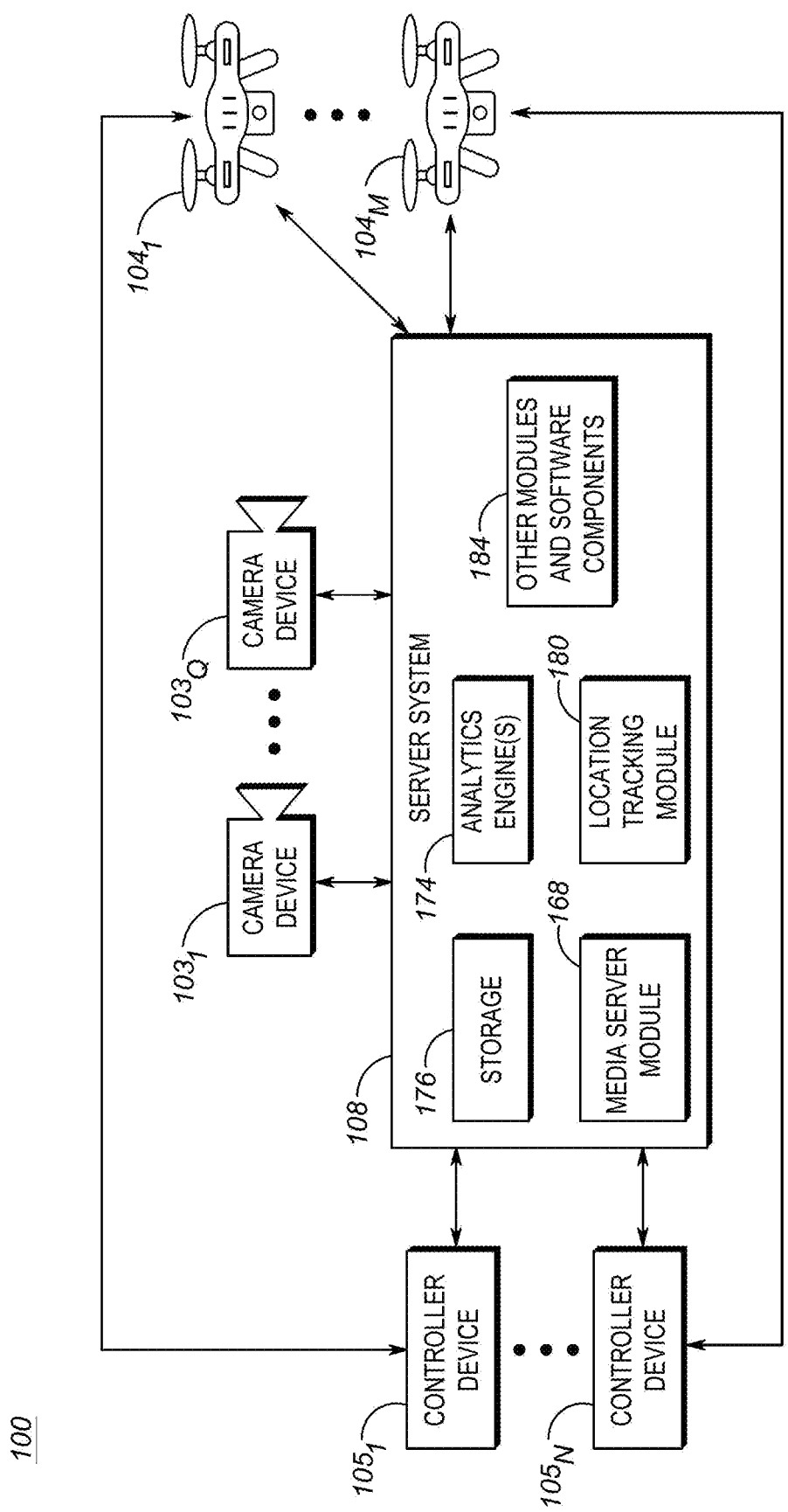
FIG. 1 is a block diagram showing a drone system within which methods in accordance with example embodiments can be carried out.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method that includes providing a plurality of data sets corresponding to a plurality of potential flight paths for a drone. Each of the data sets includes: i) a respective one of at least first and second different exit from Line Of Sight (LOS) geolocation-time data for the drone; and ii) a respective one of at least first and second different return to LOS geolocation-time data for the drone. The computer-implemented method also includes determining a first out-of-LOS time interval derived from both the first exit from LOS geolocation-time data and the first return to LOS geolocation-time data. The computer-implemented method also includes determining a second out-of-LOS time interval derived from both the second exit from LOS geolocation-time data and ending at the second return to LOS geolocation-time data. The computer-implemented method also includes determining a plurality of additional time intervals when respective one or more substitute drone observers can observe the drone within at least one substitute LOS geographic region corresponding to when the drone can be outside an LOS geographic region of a primary drone observer. The computer-implemented method also includes generating suitability scores for at least first and second of the potential flight paths that correspond to the first and second out-of-LOS time intervals. The generating of the suitability scores factors in: i) comparisons of at least the first and second out-of-LOS time intervals against the additional time intervals; and ii) one or more additional suitability factors impacting flight path selection. The computer-implemented method also includes providing a visually or audibly perceptible recommendation message that recommends one of the first and second potential flight paths as more suitable than one or more others of the plurality of potential flight paths for the drone. The one of the first and second potential flight paths is recommended at least in part based on a ranking of the suitability scores.

According to another example embodiment, there is provided a system that includes at least one storage device configured to store a plurality of data sets corresponding to a plurality of potential flight paths for a drone. Each of the data sets includes: i) a respective one of at least first and second different exit from Line Of Sight (LOS) geolocation-time data for the drone; ii) a respective one of at least first and second different return to LOS geolocation-time data for the drone. The system also includes at least one processor communicatively coupled to the at least one storage device to read stored data therefrom. The at least one processor is configured to determine a first out-of-LOS time interval derived from both the first exit from LOS geolocation-time data and the first return to LOS geolocation-time data. The at least one processor is also configured to determine a second out-of-LOS time interval derived from both the second exit from LOS geolocation-time data and ending at the second return to LOS geolocation-time data. The at least one processor is also configured to determine a plurality of additional time intervals when respective one or more substitute drone observers can observe the drone within at least one substitute LOS geographic region corresponding to when the drone can be outside an LOS geographic region of a primary drone observer. The at least one processor is also configured to generate suitability scores for at least first and second of the potential flight paths that correspond to the first and second out-of-LOS time intervals. The generating of the suitability scores factors in: i) comparisons of at least the first and second out-of-LOS time intervals against the additional time intervals; and ii) one or more additional suitability factors impacting flight path selection. The at least one processor is also configured to generate a recommendation message that recommends one of the first and second potential flight paths as more suitable than one or more others of the plurality of potential flight paths for the drone, wherein the one of the first and second potential flight paths is recommended at least in part based on a ranking of the suitability scores. The at least one processor is also configured to output the recommendation message over a path that enables communication of the recommendation message to a speaker or a display.

Each of the above-mentioned embodiments will be discussed in more detail below, starting with example system and device architectures of the system in which the embodiments may be practiced, followed by an illustration of processing blocks for achieving an improved technical method, system and computer program product for observation management of a drone. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of a drone system 100 within which methods in accordance with example embodiments can be carried out. The drone system 100 includes one or more video camera devices $103_1$-$103_Q$ (hereinafter interchangeably referred to as "video cameras $103_1$-$103_Q$" when referring to all of the illustrated video cameras, or "video camera 103" when referring to any individual one of the plurality) where Q is any suitable integer greater than one (although not illustrated, in alternative examples it is contemplated that the drone system 100 may include less than two of the video cameras $103_1$-$103_Q$). The drone system 100 also includes a plurality of drones $104_1$-$104_M$ (hereinafter interchangeably referred to as "drones $104_1$-$104_M$" when referring to all of the illustrated drones, or "drone 104" when referring to any individual one of the plurality) where M is any suitable integer greater than one (although not illustrated, in alternative examples it is contemplated that the drone system 100 may include only one drone 104). The drone system 100 also includes a plurality of controller devices $105_1$-$105_N$ (hereinafter interchangeably referred to as "controller devices $105_1$-$105_N$" when referring to all of the controller devices, or "controller device 105" when referring to any individual one of the plurality) where N is any suitable integer greater than one (although not illustrated, in alternative examples it is contemplated that the drone system 100 may include only one controller device 105). The drone system 100 also includes a server system 108.

With respect to the server system 108, this could comprise a single physical machine or multiple physical machines. It will be understood that the server system 108 need not be contained within a single chassis, nor necessarily will there be a single location for the server system 108. In some examples, ownership and operation of the server system 108 may reside with a single entity; however in alternative examples the ownership and operation of the server system 108 may be divided between a plurality of different entities. As will be appreciated by those skilled in the art, at least some of the functionality of the server system 108 can be implemented within one or more of the other illustrated parts of the overall system (i.e. the video camera 103, the drone 104 and/or the controller device 105) rather than within the server system 108.

Each of the video cameras $103_1$-$103_Q$, the drones $104_1$-$104_M$ and the controller devices $105_1$-$105_N$ communicate with the server system 108 through one or more networks. These networks can include the Internet, or one or more other public/private networks coupled together by network switches or other communication elements. The network(s) could be of the form of, for example, client-server networks, peer-to-peer networks, etc. Data connections between any of the above-mentioned devices and the server system 108 can be implemented, to the extent one skilled in the art would understand it suitable to do so, as any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In some examples, some or all of the video cameras $103_1$-$103_Q$, the drones $104_1$-$104_M$ and the controller devices $105_1$-$105_N$ may communicate directly or indirectly with other parts of drone system 100 besides the server system 108. For instance, in the illustrated example embodiment each of the controller devices $105_1$-$105_N$ is illustrated as being capable of communicating directly (i.e. wirelessly) with a respective at least one of the drones $104_1$-$104_M$.

Figure 2:
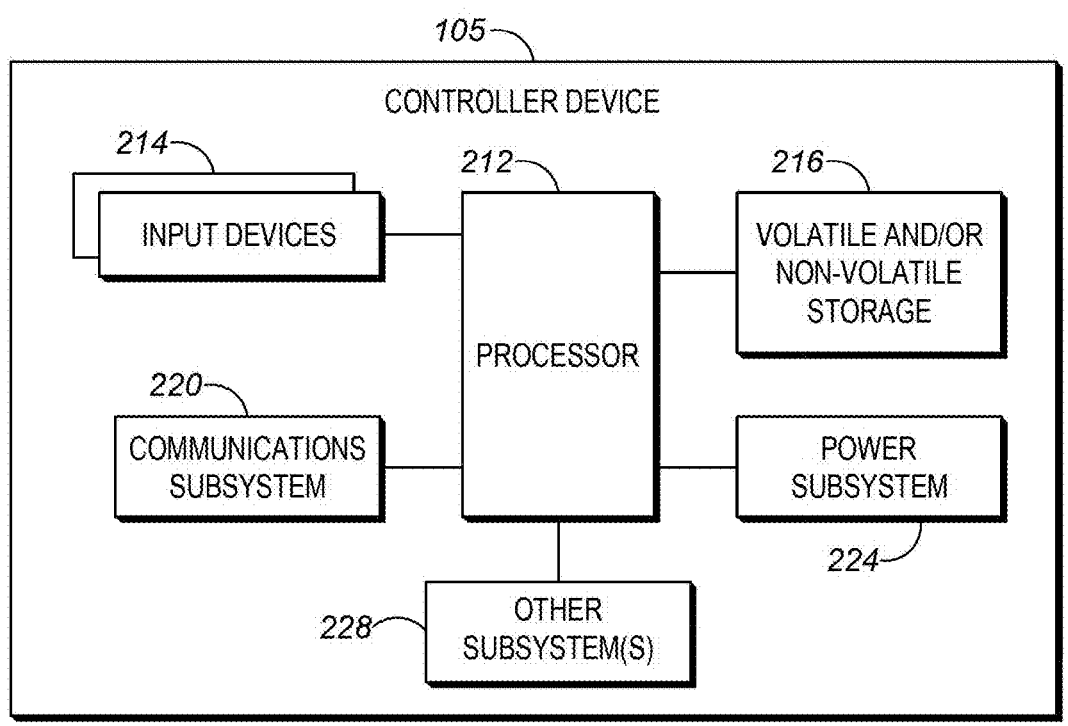
FIG. 2 is a block diagram showing more detail of one of the controller devices shown in FIG. 1.

More details of the controller device 105 are shown in FIG. 2. In some examples, the controller device 105 is a dedicated drone controller; however in other example examples the controller device 105 is a selected one or more of the following: a handheld device such as, for example, a tablet, a phablet, a smart phone or a personal digital assistant (PDA); a laptop computer; a smart television; a two-way radio; and other suitable devices. The electronic controller device 105 includes at least one processor 212 that controls the overall operation of the controller device 105. The processor 212 interacts with various subsystems such as, for example, input devices 214 (such as a selected one or more of a joystick, keyboard, mouse, touch pad, roller ball and voice control means, for example), volatile and/or non-volatile storage 216, communications subsystems 220, power subsystem 224, and other subsystem(s) 228.

The communications subsystem 220 shown in FIG. 2 enables the communication related functions of the controller device 105 as will be understood by those skilled in the art including transmission and reception of data over network(s) as previously herein mentioned. Regarding the volatile and/or non-volatile storage 216, this can serve any variety of different purposes as will be understood by those skilled in the art including, for example, temporary or permanent storing of applications, buffering of data to be transmitted and received via the communications subsystem 220. Regarding this power subsystem(s) 224, these provide the power needed by the controller device 105 to permit associated power consuming device operation and may include, for example, a battery pack or other suitable powering apparatus known to those skilled in the art. Finally, as mentioned the controller device 105 also includes one or more other subsystem(s) 228 (for example, the controller device 105 may optionally include a display and a display controller subsystem that interacts with the display in order to render graphics and/or text upon the display).

The processor 212, in addition to the functionality already mentioned, can enable the execution of software on the controller device 105. In at least one example, the controller device may include communications related application(s) such as, for instance, any one or more of an email application, an instant messaging application, a talk group application, etc. Additionally, any communications related application(s) may, in some examples, facilitate requests for (and/or receiving of) captured video from the server system 108. Other examples of software executable on the controller device 105 are contemplated such as, for instance, security related application(s) which may include, for example, a Video Management Software (VMS) application to enable a user of the controller device 105 to carry out actions related to providing input in relation to images, live video and video recordings (such as, for instance, input to facilitate annotating or selectively exporting, to incident report folders, video footage captured by any cameras built into or attached to a controlled drone).

Referring once again to FIG. 1, the server system 108 includes several software components for carrying out other functions of the server system 108. For example, the server system 108 optionally includes a media server module 168. The media server module 168 handles client requests related to storage and retrieval of video taken by video camera devices $103_1$-$103_q$ (or other video cameras) in the drone system 100. In some examples, the media server module 168 may carry out other functions in relation to other forms of media communicated to the controller device 105 (or other device within the drone system 100) from the server system 108. The server system 108 also optionally includes analytics engine(s) 174 which can include, in some examples, any suitable one of known commercially available software that carry out computer vision related functions (complementary to any video analytics performed in the video cameras or other edge devices) as understood by a person of skill in the art. The analytics engine(s) 174 can also optionally include software for carrying out non-video analytics, such as audio analytics that may, for example, extract data from data-over-sound, convert spoken words into text, carry out audio emotion recognition, etc. The server system 108 also includes storage 176 which may store, for instance, software and data (for example, data organized in one or more databases). Optionally, the storage 176 may persistently store recorded video and metadata (related to, for example, the recorded video that is storable within the storage 176). The storage 176 may also optionally store other types of metadata besides video metadata. Examples of metadata other than video metadata, that may be stored in the storage 176, include audio metadata, Global Positioning System (GPS) location metadata, etcetera.

Continuing on, the server system 108 also includes a location tracking module 180 (the details of which will later herein be described more fully). Additionally, the illustrated server system 108 includes a number of other modules and software components 184. These other software components will vary depending on the requirements of the server system 108 within the overall system. As just one example, the other modules and software components 184 might include special test and debugging software, or software to facilitate version updating of modules within the server system 108. The other modules and software components 184 may also include one or more server-side modules that provide cooperative counterpart functionality to one or more of the client application(s) that run on devices within the drone system 100.

Still with reference to FIG. 1, the video camera 103 is operable to capture a plurality of video frames and produce video data representing the plurality of captured video frames. In some examples, the video camera 103 is configured to be selectively repurposed as a substitute drone observer within the drone system 100, and then at other times the video camera 103 may be dedicated to a different system such as, for example, a security system. The video camera 103, a video capturing device, may include, for example, a security video camera, a mobile video camera wearable by a person, or some other type of fixed-position or mobile video camera.

The video camera 103 includes at least one image sensor for capturing a plurality of video frames. The video camera 103 may be a digital video camera, or alternatively the video camera 103 may be an analog video camera connected to an encoder. The video camera 103 may be a 2D video camera; however use of a structured light 3D video camera, a time-of-flight 3D video camera, a 3D Light Detection and Ranging (LiDAR) device, a stereo video camera, or any other suitable type of video camera within the drone system 100 is contemplated.

The video camera 103 may have characteristics such that it may be described as being a "multi-sensor" type of video camera, such that the video camera 103 includes pairs of two or more sensors that are operable to capture light in different and/or same frequency spectrum ranges. Also, the video camera 103 may be a dedicated video camera. It will be understood that a dedicated video camera herein refers to a video camera whose principal features are to capture images and video. In some example embodiments, the dedicated video camera may perform functions associated with the captured images or video, such as but not limited to processing the video data produced by it or by another video camera. For example, the dedicated video camera may optionally be a security video camera, such as any one of a pan-tilt-zoom video camera, dome video camera, in-ceiling video camera, box video camera, and bullet video camera.

Additionally, or alternatively, the video camera 103 may include an embedded video camera. It will be understood that an embedded video camera herein refers to a video camera that is embedded within a device that is operational to perform functions that are unrelated to the captured image or video. For example, the embedded video camera may be a video camera found on any one of a laptop, tablet, drone device, smartphone, physical access control device, etcetera.

Figure 3:
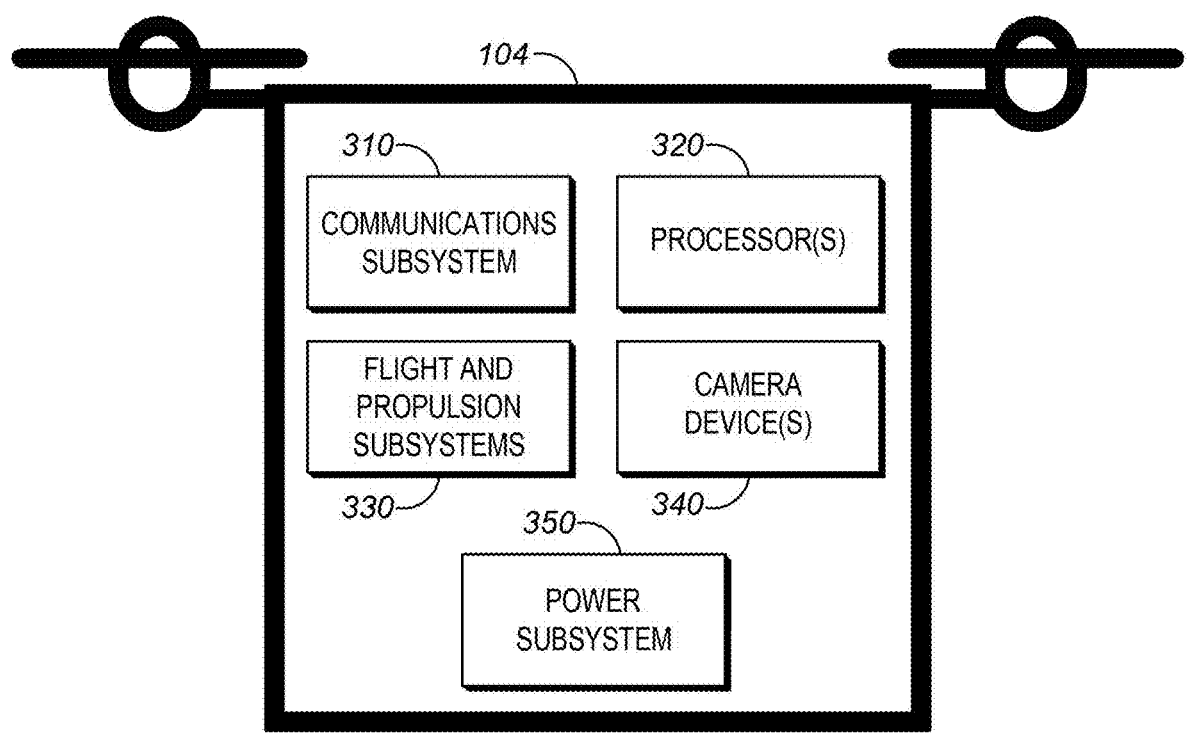
FIG. 3 is a block diagram showing more detail of one of the drones shown in FIG. 1.

Reference is now made to FIG. 3. FIG. 3 is a block diagram showing more detail of one of the drones $104_1$-$104_M$ shown in FIG. 1. The illustrated drone 104 includes a communications subsystem 310, one or more processors 320, flight and propulsion subsystems 330, one or more camera device(s) 340, and a power subsystem 350.

Regarding the communications subsystem 310, this enables the wireless communication of signals received at the drone 104 or transmitted from the drone 104. In some examples, the communications subsystem 310 may include a plurality of communications components such as, for example, any one or more of the following: an Ultra-High Frequency (UHF) communications component, a Very High Frequency (VHF) communications component, a satellite communications component, a payload communications component, and a Long-Term Evolution (LTE) communications component.

Regarding the one or more processors 320, these may control various operations within the drone 104 in a manner that is either complementary to or separate from any specialized processors that operate dedicatedly in controlling specific subsystems within the drone 104.

Regarding the flight and propulsion subsystems 330, this actuates specialized mechanical parts withing the drone 104 responsible for drone movement. The flight and propulsion subsystems 330 also cause generation of the thrust force that propels the drone 104 in flight.

Regarding the camera device(s) 340, these are one or more cameras integrated or attached (for example, attached as payload) to the drone 104. The camera device(s) 340 capture images and/or video (for example, for security-related purposes, as part of a first responders' incident response, etcetera).

Regarding the power subsystem 350, this includes components of the drone 104 that enable power to be sourced and/or distributed within the drone 104 including for example, a battery pack, charging circuitry, power management circuitry, etc.

Figure 4:
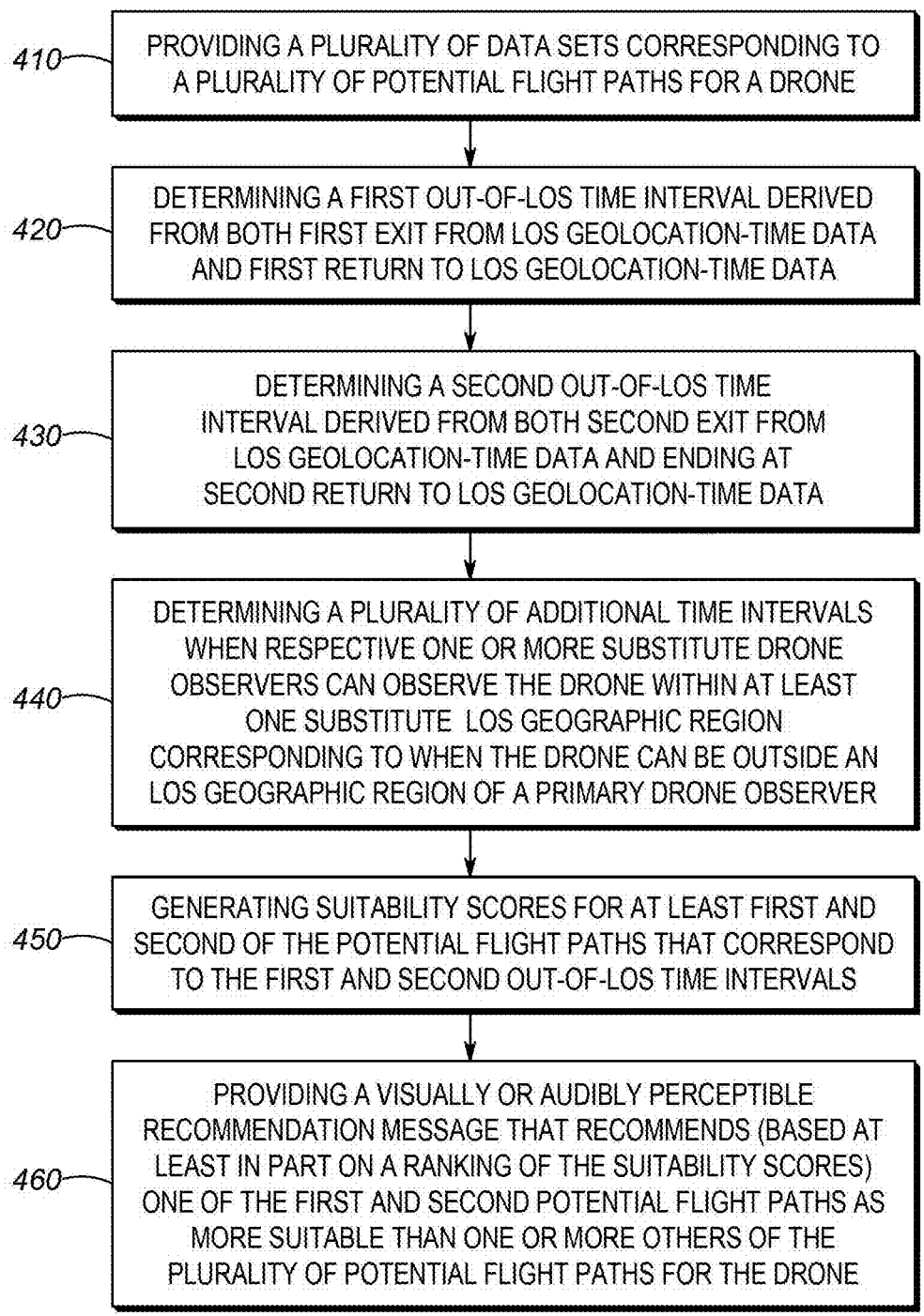
FIG. 4 is a flow chart illustrating a computer-implemented method in accordance with an example embodiment.

Reference is now made to FIG. 4. FIG. 4 is a flow chart illustrating a method 400 in accordance with an example embodiment.

The illustrated method 400 includes providing a plurality of data sets (410) corresponding to a plurality of potential flight paths for a drone. Each of the data sets includes a respective one of at least first and second different exit from Line Of Sight (LOS) geolocation-time data for the drone 104, and a respective one of at least first and second different return to LOS geolocation-time data for the drone 104. In at least one example, each of the data sets may include other data such as, for instance, a respective one of at least first and second start-point geolocation-time data for the drone 104, and a respective one of at least first and second end-point geolocation-time data for the drone 104.

Next, the illustrated method 400 of FIG. 4 includes determining a first out-of-LOS time interval (420) derived from both the first exit from LOS geolocation-time data and the first return to LOS geolocation-time data.

Next, the illustrated method 400 of FIG. 4 includes determining a second out-of-LOS time interval (430) derived from both the second exit from LOS geolocation-time data and ending at the second return to LOS geolocation-time data.

Next, the illustrated method 400 of FIG. 4 includes determining a plurality of additional time intervals (440) when respective one or more substitute drone observers can observe the drone within at least one substitute LOS geographic region corresponding to when the drone can be outside an LOS geographic region of a primary drone observer.

Next, the illustrated method 400 of FIG. 4 includes generating suitability scores (450) for at least first and second of the potential flight paths that correspond to the first and second out-of-LOS time intervals. The generation of the suitability scores may factor in comparisons of at least the first and second out-of-LOS time intervals against the additional time intervals. The generation of the suitability scores may also factor in one or more additional suitability factors impacting flight path selection. Additional suitability factors may include, for example, one or more of impact on operator safety, converging time, mode of transportation compatibility, primary operator fatigue, substitute operator fatigue, and minimum distance for operator to travel.

Next, the illustrated method 400 of FIG. 4 includes providing a visually or audibly perceptible recommendation message (460) that recommends (based at least in part on a ranking of the suitability scores) one of the first and second potential flight paths as more suitable than one or more others of the plurality of potential flight paths for the drone 104.

Figure 5:
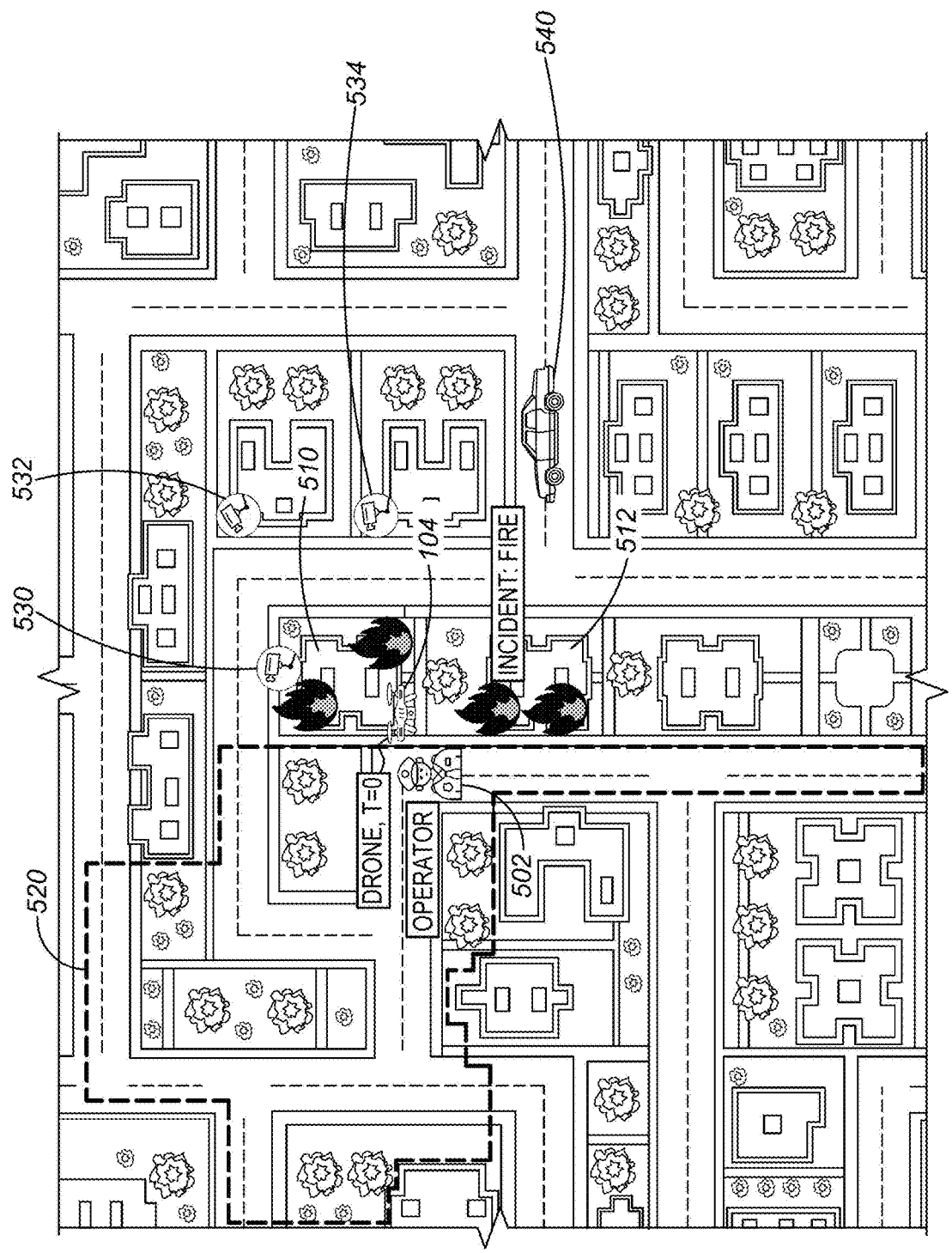
FIG. 5 is a first diagram of a geographic area, and illustrating example embodiment details of management of a drone being operated therein.

The method 400 of FIG. 4 may optionally include additional actions (to the extent suitable for the selected implementation) including one or more of the following:

Receiving confirmation from at least the primary drone observer that one of the first and second potential flight paths is a confirmed flight path Based on the above-mentioned confirmation, generating and providing an informational message to the primary drone observer that provides information of when and where to be when the drone re-enters a region corresponding to a future LOS of the primary drone observer Receiving an inputted request from the primary drone observer to make a time that the drone re-enters the region earlier than indicated in the above-mentioned informational message Providing a confirmation message of a corresponding change to the above-mentioned time when the corresponding change is calculated to be compatible with operating parameters of the drone Reference is now made to FIG. 5. FIG. 5 is a first diagram of a geographic area 500, and this diagram is illustrating example embodiment details of the drone 104 being operated therein.

As shown, a drone operator (primary drone observer) 502 has undocked (or otherwise released) the drone 104 at the scene of a fire incident (e.g. building 510 and 512 are on fire). The drone operator 502 can see (i.e. with his naked eyes or with an optical lens-based accessory) certain parts of the geographic area 500, but other parts of the geographic area 500 he cannot see. More specifically, LOS geographic region 520 corresponds to the parts of the geographic area 500 that the drone operator 502 can see. Other parts of the geographic area 500 outside of the LOS geographic region 520 area where the drone operator 502 cannot see. The boundaries for the LOS geographic region 520 can be entered manually (for example, interactively drawn on a map presented on a user interface to a user of the controller device 105). Alternatively, the boundaries for the LOS geographic region 520 can be computed automatically based on available data including, for example, geolocation of the drone operator 502 provided to the location tracking module 180 and data available within (and/or accessible to) the drone system 100 as to the locations and geometries of obstructions impacting the boundaries for the LOS geographic region 520.

Also shown within the geographic area 500 are fixed video cameras 530, 532 and 534, as well as a vehicle 540. Each of the fixed video cameras 530, 532 and 534 may correspond to one of the previously described video camera devices $103_1$-$103_q$ (FIG. 1). In at least one example, each of the fixed video cameras 530, 532 and 534 may be remotely accessible for live video viewing. Regarding the vehicle 540, at least one occupant thereof may be a substitute drone observer (the purpose of the substitute drone observer was previously herein described in connection with the method 400). Also, it should be noted that other people besides vehicle occupants are contemplated for potential substitute drone observers such as, for example, any suitable human observer that is able to be physically present within a substitute LOS geographic region.

Figure 6:
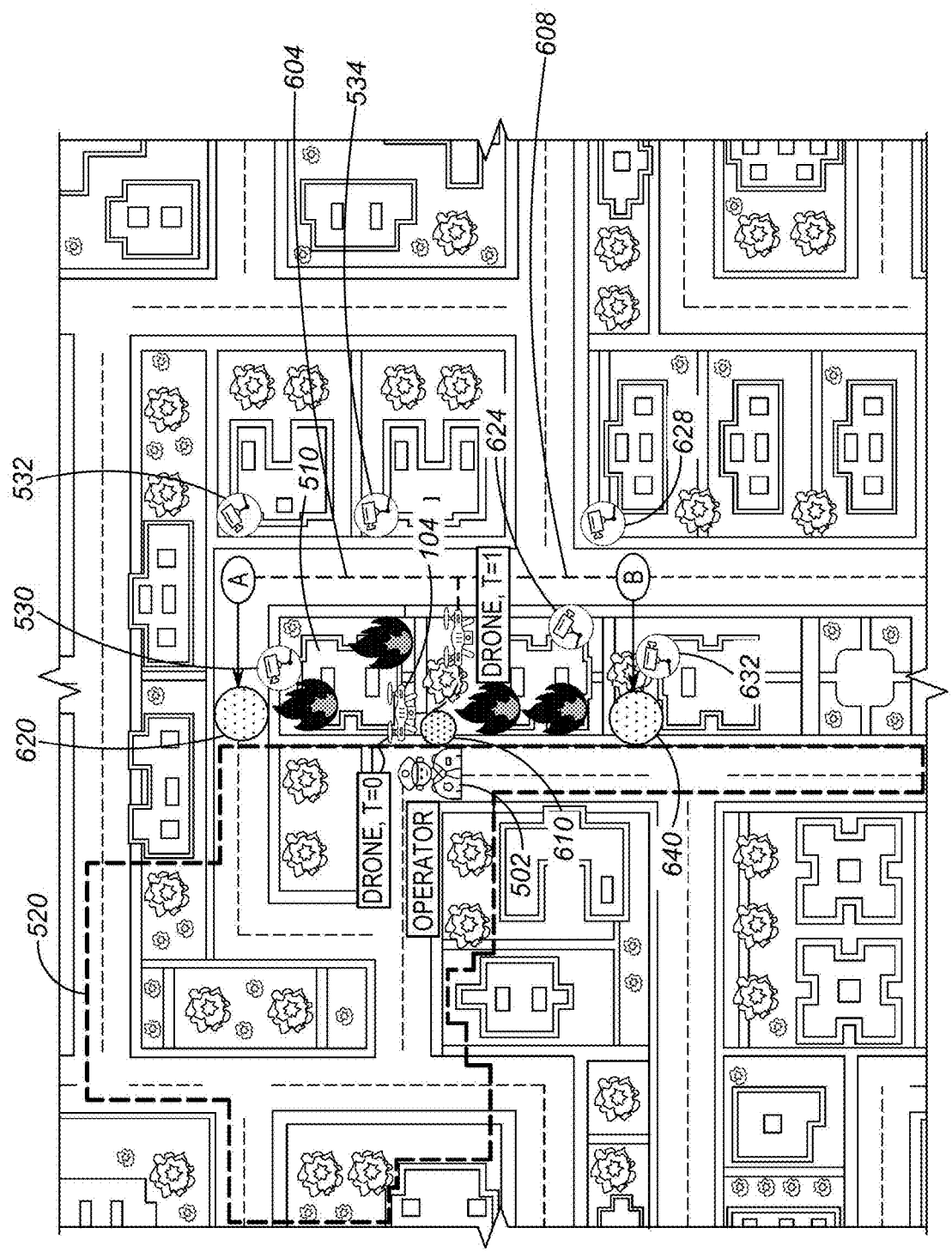
FIG. 6 is a second diagram of the geographic area of FIG. 5, and illustrating additional example embodiment details of management of a drone being operated therein.

Continuing on, FIG. 6 is a second diagram of the geographic area 500 illustrating additional details of an example embodiment. In particular, illustrated are two potential flight paths for the drone 104: Path "A" (first path 604); and Path "B" (second path 608).

Regarding the first path 604, the fixed video cameras 530, 532 and 534 are shown as sufficiently close to points along the first path 604 such that the drone 104 will pass through respective FOVs of these cameras when travelling from initial start point 610 to first path converge point 620. Regarding the second path 608, fixed video cameras 624, 628 and 632 are similarly shown as sufficiently close to points along the second path 608 such that the drone 104 will pass through respective FOVs of these cameras when travelling from initial start point 610 to second path converge point 640. In at least one example, each of the fixed video cameras 624, 628 and 632 may be remotely accessible for live video viewing.

It will be understood the expected flight time of the drone 104 along the first path 604 as compared to the second path 608 may differ substantially due to various factors including, for instance, travel distance, wind (speed, direction), etcetera. For example, the expected flight time along the first path 604 might be ten minutes, whereas the expected flight time along the second path 608 might be seven minutes. Of course it is possible that the shorter expected flight time may be a suitability factor impacting selection of one potential flight path over a different potential flight path. In such case, the shorter expected flight time of the second path 608 may weigh towards recommendation of the second path 608 over the first path 604.

Figure 7:
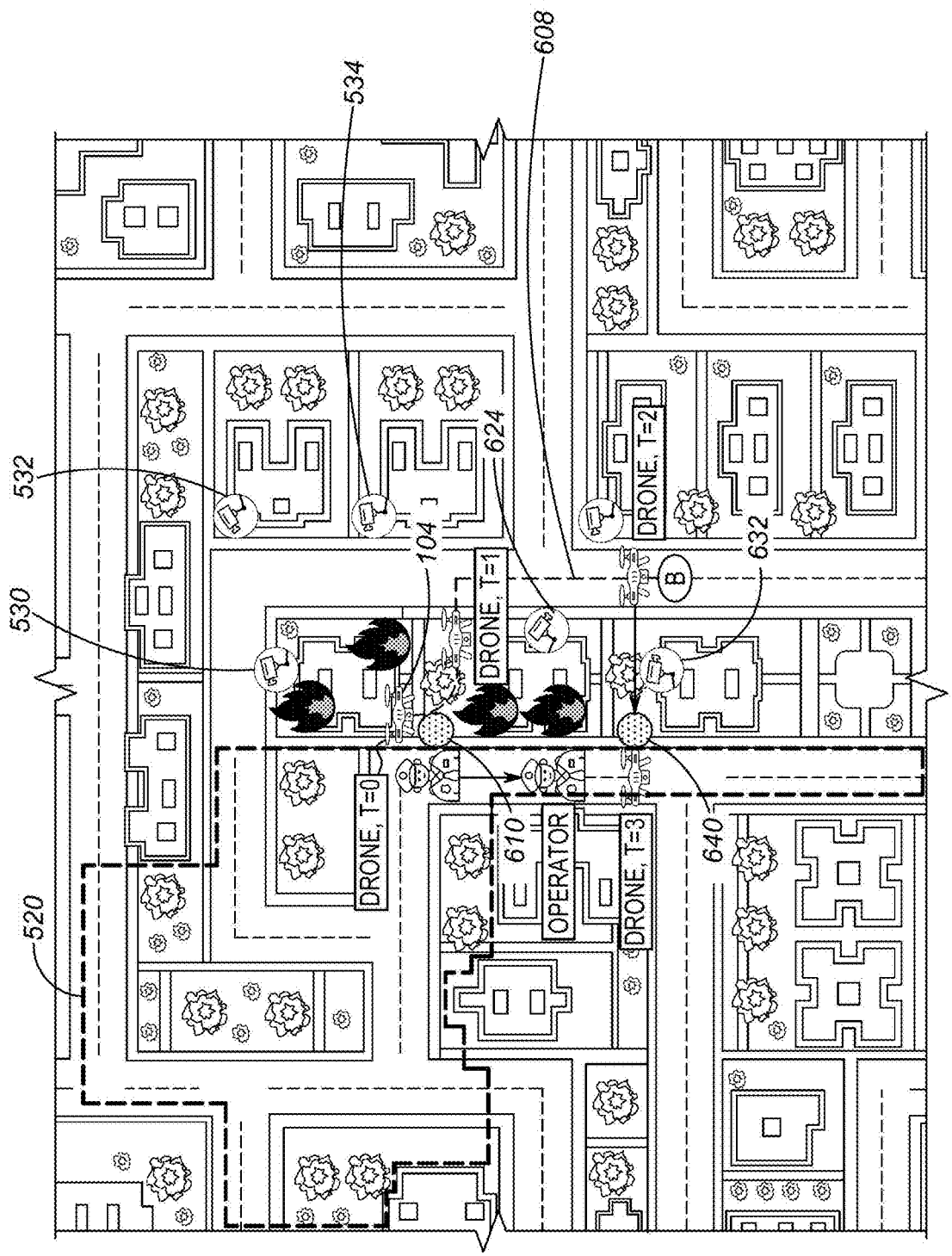
FIG. 7 is a third diagram of the geographic area of FIG. 5, and illustrating additional example embodiment details of management of a drone being operated therein.

Turning now to FIG. 7, this is relating to selection (for example, based on recommendation) of the second path 608 over other possible path(s). In particular, FIG. 7 is a third diagram of the geographic area 500 corresponding to selection of the second path 608 and illustrating details of associated movements of both the drone operator 502 and the drone 104 from the initial start point 610 to second path converge point 640.

Figure 8:
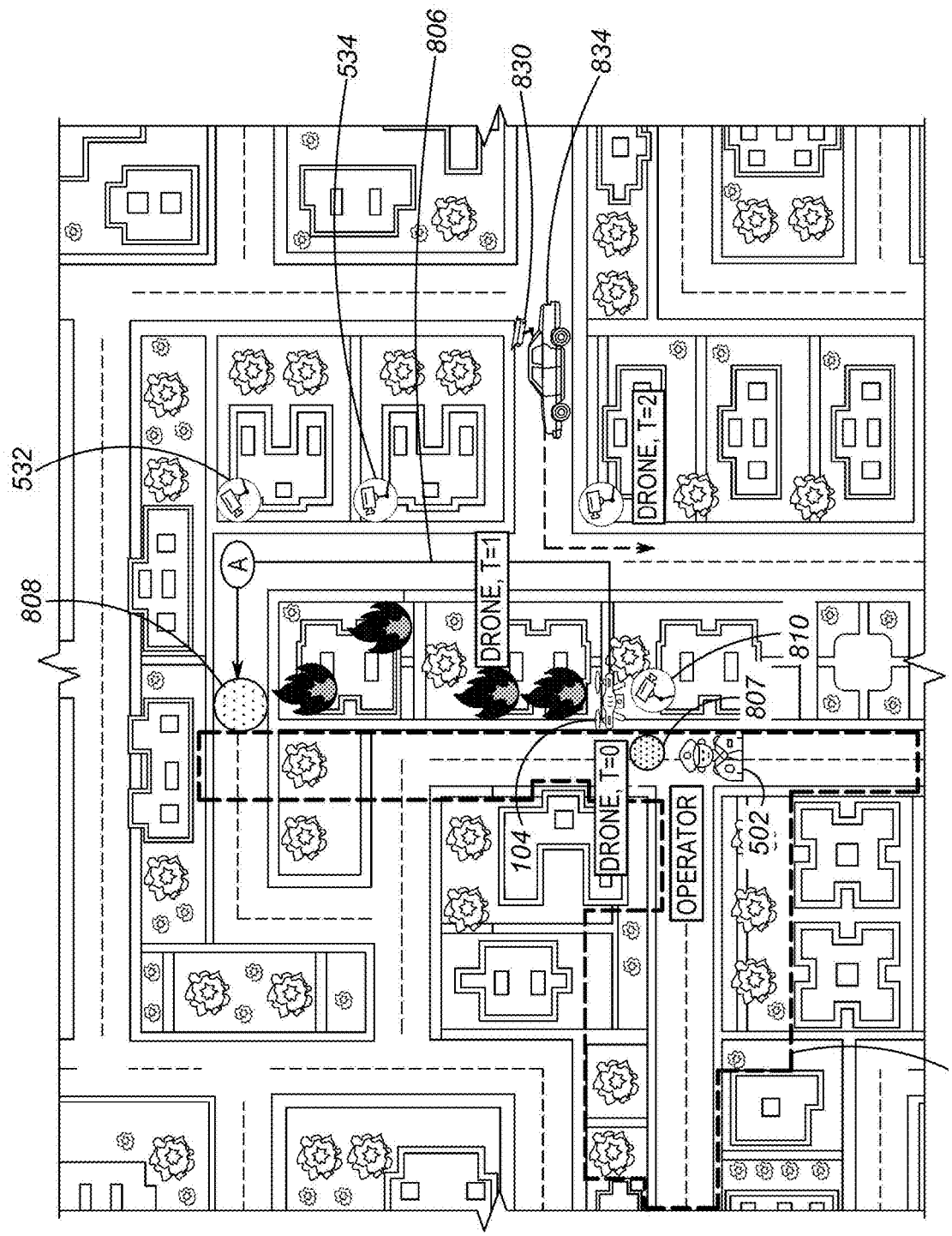
FIG. 8 is a fourth diagram of the geographic area of FIG. 5, and illustrating additional example embodiment details of management of a drone being operated therein.
Figure 9:
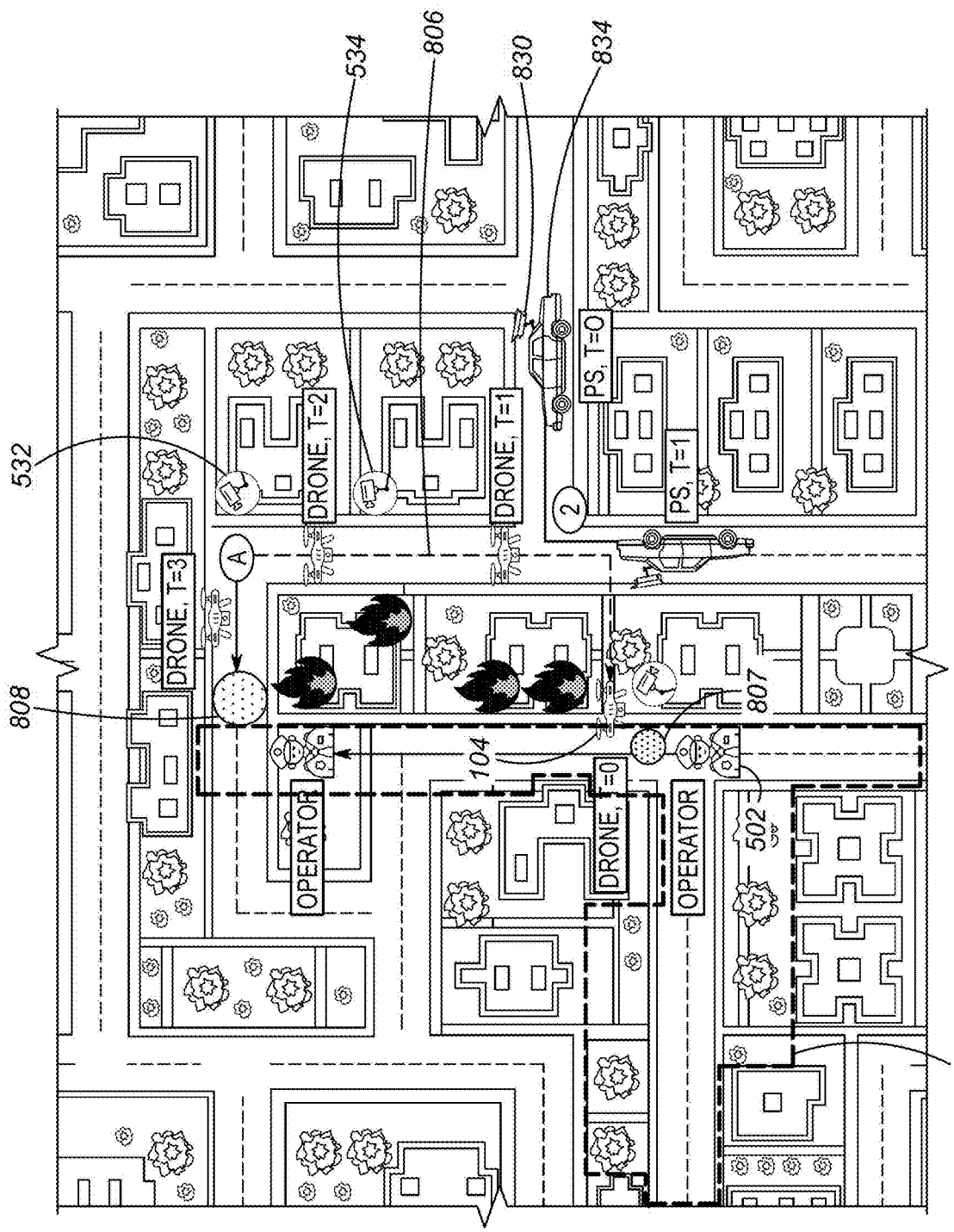
FIG. 9 is a fifth diagram of the geographic area of FIG. 5, and illustrating additional example embodiment details of management of a drone being operated therein.

FIG. 8 is a fourth diagram of the geographic area 500 illustrating a scenario where the substitute observation for the drone 104 (i.e. observation outside of LOS geographic region 804 of the drone operator 502) is a combination of fixed-location video camera coverage and dynamic (mobile) video camera coverage. In particular, flight path 806 for the drone 104 from initial point 807 to convergence point 808 includes FOV coverage by the fixed video camera 532 and 534, and also fixed video camera 810 (in at least one example, each of these three fixed video cameras may be remotely accessible for live video viewing); however a gap in FOV coverage between the fixed video camera 534 and the fixed video camera 810 is covered by an in-vehicle (mobile) camera 830 attached to vehicle 834. In other words, the drone system 100 may send a message to a driver of the vehicle 834 to bring the vehicle to the FOV gap location at a time when the location tracking module 180 calculates the drone 104 to be travelling through the FOV gap location. This is shown in more detail in FIG. 9 (a fifth diagram of the geographic area 500 showing additional movement details relating to the drone 104, the vehicle 834, and the drone operator 502).

Figure 10:
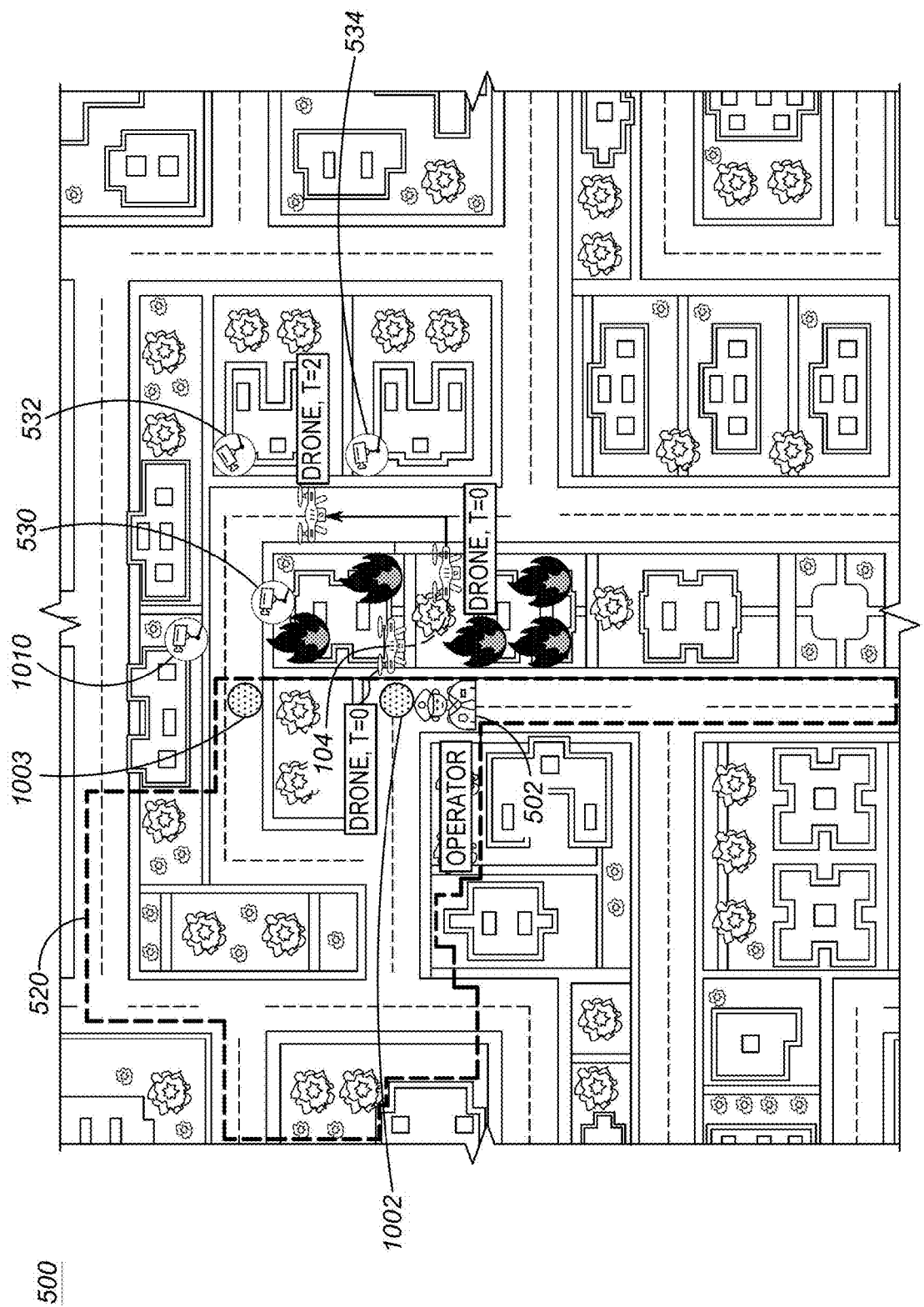
FIG. 10 is a sixth diagram of the geographic area of FIG. 5, and illustrating additional example embodiment details of management of a drone being operated therein.
Figure 11:
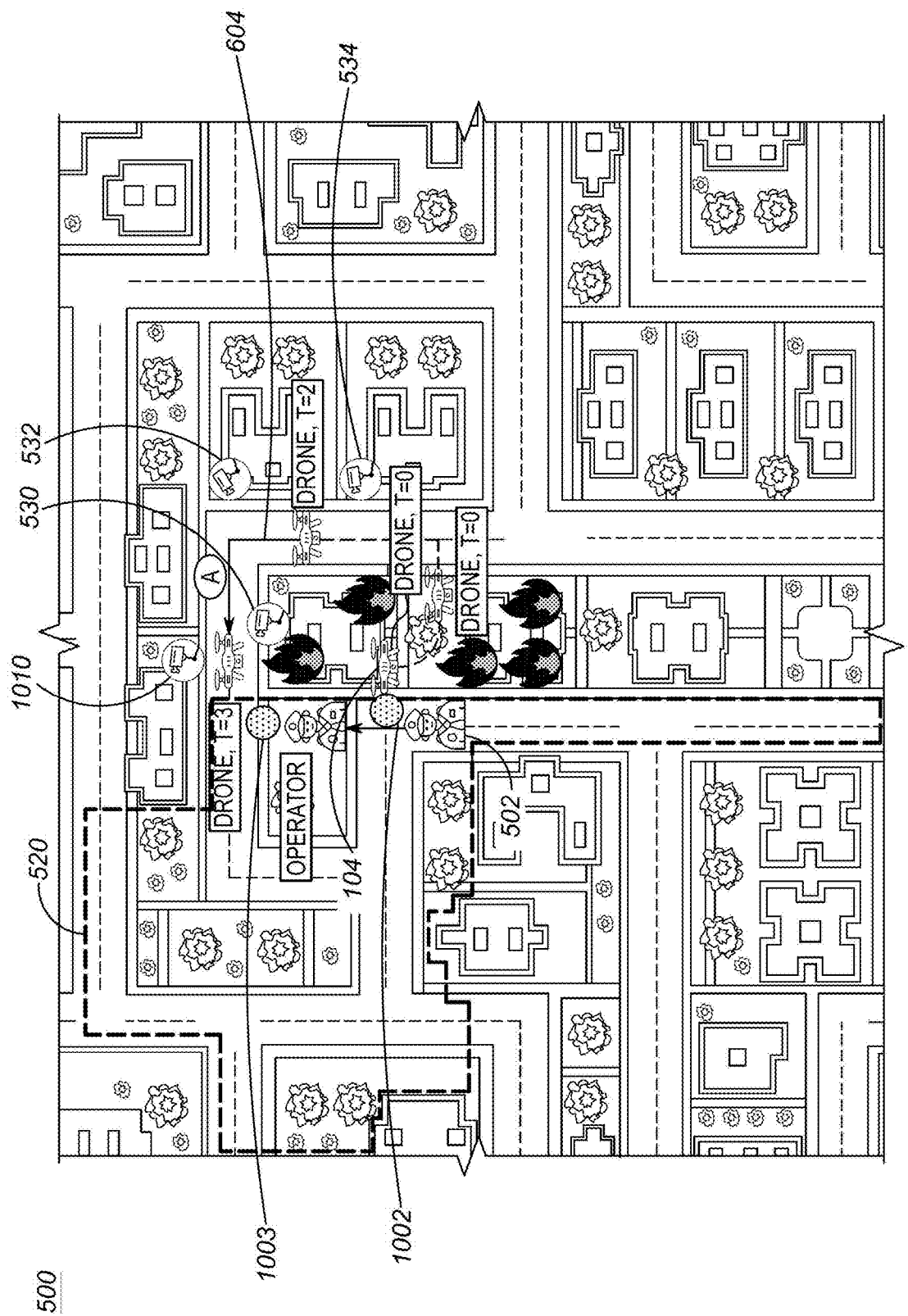
FIG. 11 is a seventh diagram of the geographic area of FIG. 5, and illustrating additional example embodiment details of management of a drone being operated therein.

FIGS. 10 and 11 are sixth and seventh diagrams respectively of the geographic area 500 illustrating a scenario where path options are restricted to a single initial point 1002 and a single path converge point 1003. As illustrated, both the operator 502 and the drone 104 move from the initial point 1002 to the path converge point 1003. A flight path for the drone 104 from initial point 1002 to convergence point 1003 includes FOV coverage by the fixed video cameras 530, 532 and 534, and also another fixed video camera 1010 (in at least one example, each of these four fixed video cameras may be remotely accessible for live video viewing). Also, it should be noted that a plurality of available paths (two-dimensionally and three-dimensionally) between the two points (as well as drone flight time) may still differ, and so the method 400 of FIG. 4 is still applicable notwithstanding that the singularity of the location of the path converge point means that it cannot be included as one of the suitability factors.

As should be apparent from this detailed description, the operations and functions of the electronic computing device are sufficiently complex as to require their implementation on a computer system, and cannot be performed, as a practical matter, in the human mind. Electronic computing devices such as those set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and a human mind cannot provide a drone flight path recommendation message visually on a screen or audibly via a speaker, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . aa", "has . . . aa", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
providing an electronically controllable drone;
providing a plurality of data sets corresponding to a plurality of potential flight paths for the electronically controllable drone, and each of the data sets including:
a respective one of at least first and second different exit from Line Of Sight (LOS) geolocation-time data for the electronically controllable drone, and
a respective one of at least first and second different return to LOS geolocation-time data for the electronically controllable drone;
determining a first out-of-LOS time interval derived from both the first exit from LOS geolocation-time data and the first return to LOS geolocation-time data;
determining a second out-of-LOS time interval derived from both the second exit from LOS geolocation-time data and ending at the second return to LOS geolocation-time data;
determining a plurality of additional time intervals when respective one or more substitute drone observers can observe the electronically controllable drone within at least one substitute LOS geographic region corresponding to when the electronically controllable drone can be outside an LOS geographic region of a primary drone observer;
generating suitability scores for at least first and second of the potential flight paths that correspond to the first and second out-of-LOS time intervals, wherein the generating of the suitability scores factors in:
comparisons of at least the first and second out-of-LOS time intervals against the additional time intervals, and
one or more additional suitability factors impacting flight path selection;
providing a visually or audibly perceptible recommendation message that recommends one of the first and second potential flight paths as more suitable than one or more others of the plurality of potential flight paths for the electronically controllable drone, wherein the one of the first and second potential flight paths is recommended at least in part based on a ranking of the suitability scores;
receiving confirmation from at least the primary drone observer that the one of the first and second potential flight paths is a confirmed flight path; and
controlling the electronically controllable drone to fly the confirmed flight path.

2. The computer-implemented method of claim 1 wherein the one or more substitute drone observers includes at least one video camera remotely accessible for live video viewing.

3. The computer-implemented method of claim 2 wherein the at least one video camera is an at least one fixed-position security camera.

4. The computer-implemented method of claim 1 wherein the one or more substitute drone observers includes one or more people occupying respective one or more vehicles to be physically present within the at least one substitute LOS geographic region.

5. The computer-implemented method of claim 1 wherein the one or more substitute drone observers includes a combination of at least one human observer and at least one video camera remotely accessible for live video viewing.

6. The computer-implemented method of claim 1 wherein the one or more additional suitability factors include at least one of impact on operator safety, converging time, mode of transportation compatibility, primary operator fatigue, substitute operator fatigue, and minimum distance for operator to travel.

7. The computer-implemented method of claim 1 further comprising:
based on the confirmation, generating and providing an informational message to the primary drone observer that provides information of when and where to be when the electronically controllable drone re-enters a region corresponding to a future LOS of the primary drone observer.

8. The computer-implemented method of claim 7 further comprising:
receiving an inputted request from the primary drone observer to make a time that the electronically controllable drone re-enters the region earlier than indicated in the informational message; and
providing a confirmation message of a corresponding change to the time when the corresponding change is calculated to be compatible with operating parameters of the electronically controllable drone.

9. The computer-implemented method of claim 1 wherein the LOS geographic region of the primary drone observer is definable via user input obtainable through user interaction with a map presented within a graphical user interface.

10. The computer-implemented method of claim 1 wherein the each of the data sets further includes:
a respective one of at least first and second start-point geolocation-time data for the electronically controllable drone, and
a respective one of at least first and second end-point geolocation-time data for the electronically controllable drone.

11. A system comprising:
an electronically controllable drone;
at least one storage device configured to store:
a plurality of data sets corresponding to a plurality of potential flight paths for the electronically controllable drone, and each of the data sets including:
a respective one of at least first and second different exit from Line Of Sight (LOS) geolocation-time data for the electronically controllable drone, and
a respective one of at least first and second different return to LOS geolocation-time data for the electronically controllable drone; and
at least one processor communicatively coupled to the at least one storage device to read stored data therefrom, and the at least one processor being configured to:
determine a first out-of-LOS time interval derived from both the first exit from LOS geolocation-time data and the first return to LOS geolocation-time data;
determine a second out-of-LOS time interval derived from both the second exit from LOS geolocation-time data and ending at the second return to LOS geolocation-time data;
determine a plurality of additional time intervals when respective one or more substitute drone observers can observe the electronically controllable drone within at least one substitute LOS geographic region corresponding to when the electronically controllable drone can be outside an LOS geographic region of a primary drone observer;

generate suitability scores for at least first and second of the potential flight paths that correspond to the first and second out-of-LOS time intervals, wherein the generating of the suitability scores factors in:
  comparisons of at least the first and second out-of-LOS time intervals against the additional time intervals, and
  one or more additional suitability factors impacting flight path selection;

generate a recommendation message that recommends one of the first and second potential flight paths as more suitable than one or more others of the plurality of potential flight paths for the electronically controllable drone, wherein the one of the first and second potential flight paths is recommended at least in part based on a ranking of the suitability scores;

output the recommendation message over a path that enables communication of the recommendation message to a speaker or a display;

in response to receiving confirmation via an input device of a controller device that the one of the first and second potential flight paths is a confirmed flight path, control the electronically controllable drone to fly the confirmed flight path.

12. The system of claim 11 wherein the one or more substitute drone observers includes at least one video camera remotely accessible for live video viewing.

13. The system of claim 12 wherein the at least one video camera is an at least one fixed-position security camera.

14. The system of claim 11 wherein the one or more substitute drone observers includes one or more people occupying respective one or more vehicles to be physically present within the at least one substitute LOS geographic region.

15. The system of claim 11 wherein the one or more substitute drone observers includes a combination of at least one human observer and at least one video camera remotely accessible for live video viewing.

16. The system of claim 11 wherein the one or more additional suitability factors include at least one of impact on operator safety, converging time, mode of transportation compatibility, primary operator fatigue, substitute operator fatigue, and minimum distance for operator to travel.

17. The system of claim 11 further comprising:
  a controller device that includes the display,
  wherein the at least one processor is further configured to:
    based on the confirmation, generating an informational message, receivable by the primary drone observer via the display, that provides information of when and where to be when the electronically controllable drone re-enters a region corresponding to a future LOS of the primary drone observer.

18. The system of claim 17 wherein the controller device further includes at least one input device configured to receive an inputted request from the primary drone observer to make a time that the electronically controllable drone re-enters the region earlier than indicated in the informational message, and the at least one processor being further configured to generate a confirmation message of a corresponding change to the time when the corresponding change is calculated to be compatible with operating parameters of the electronically controllable drone.

19. The system of claim 11 wherein the LOS geographic region of the primary drone observer is definable via user input obtainable through user interaction with a map presented within a graphical user interface.

20. The system of claim 11 wherein the each of the data sets further includes:
  a respective one of at least first and second start-point geolocation-time data for the electronically controllable drone, and
  a respective one of at least first and second end-point geolocation-time data for the electronically controllable drone.

* * * * *